March 3, 1970  J. V. BROWNE  3,498,179
DEBURRING MACHINE

Filed Dec. 7, 1967  5 Sheets-Sheet 3

INVENTOR.
JAMES V. BROWNE
BY
Charles O. Bruce
ATTORNEY

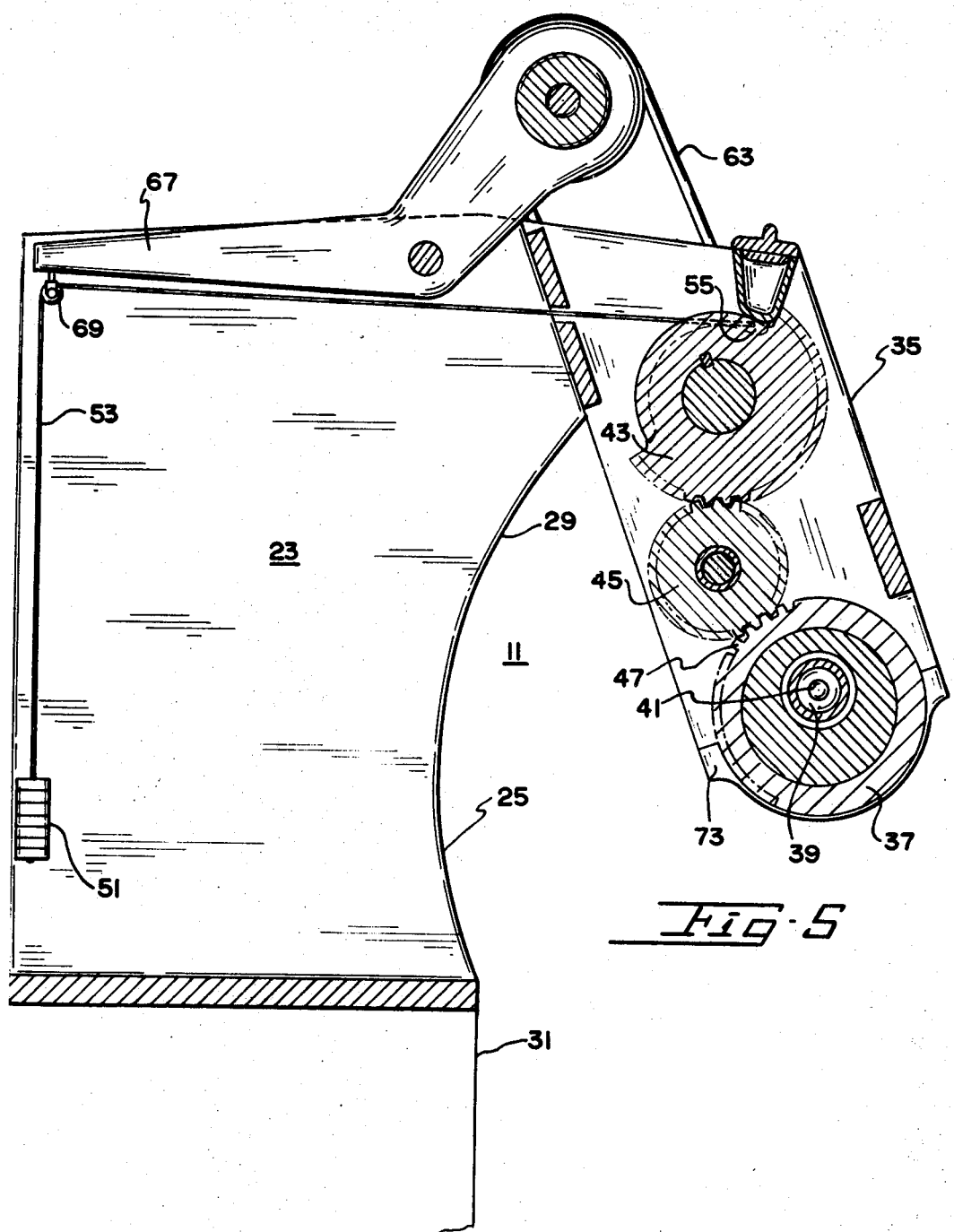

United States Patent Office 3,498,179
Patented Mar. 3, 1970

3,498,179
DEBURRING MACHINE
James V. Browne, 460 Carlston St.,
Richmond, Calif. 94805
Filed Dec. 7, 1967, Ser. No. 688,799
Int. Cl. B23f 19/10
U.S. Cl. 90—1.4                  7 Claims

ABSTRACT OF THE DISCLOSURE

A deburring machine having a shaped cutter rotated by a chuck which is movable in an arc to remove the sharp edges of spiral gear teeth and a semi-automatic indexing table for rotating a gear in increments to position each successive sharp edge of the teeth of a gear in position for machining.

BACKGROUND OF THE INVENTION

Field of the invention

The present invention relates to deburring machines and more particularly to a deburring machine for removing the sharp edge of spiral gear teeth.

When a gear is cut with a spiral tooth configuration, two of the four corners of each tooth on the gear, when viewed in a plan view configuration, have extremely sharp corners. These corners are dangerous as they can inflict very serious and dirty wounds to anyone who must handle the gear. More importantly these sharp edges cause defects in the finished gear when the gear is heat treated. The sharp edges cool too quickly during the quenching process and become very brittle and fracture either during cooling or when they are put in use. It is therefore necessary that these sharp edges be immediately removed from the rough cut gear.

DESCRIPTION OF THE PRIOR ART

As far as is known, no machine has satisfactorily performed the job of removing the sharp edges of spiral gear teeth. They must therefore be removed by a hand filing operation. This is a laborious, dangerous, inaccurate, and very expensive way to remove the burrs or sharp edges.

SUMMARY OF THE INVENTION

The present invention is a deburring machine for removing the sharp edges of spiral gear teeth and comprises a shaped cutter; a chuck for holding and rotating the cutter, the chuck being rotatable about both the rotational axis of the cutter and concurrently rotatable about an offset axis displaced from the rotational axis of the cutter; actuation means for moving the chuck about the offset axis when the chuck is rotating the cutter; and drive means for rotating the chuck while the chuck moves around the offset axis.

An indexing table is provided which comprises a base portion; a work piece mounting platform journalled for rotation with respect to the base portion; pivot means for permitting angular rotation of the platform with respect to the base portion around at least one axis of rotation; and an indexing means for rotating the platform with respect to the base portion in increments of angular rotation equal to rotating a gear mounted on the platform one gear tooth spacing.

It is therefore an important object of the present invention to provide a deburring machine for removing the sharp edges of rough cut gears having spiral gear teeth.

And it is another object of the present invention to provide a semi-automatic indexing table for rotating a rough cut gear in increments to position each successive sharp edge of a gear in position for machining by the deburring machine.

DESCRIPTION OF THE DRAWINGS

FIGURE 5 is a side elevation in section taken along lines 5—5 of FIGURE 1.

DESCRIPTION OF THE PREFERRED EMBODIMENTS

Figure 1:
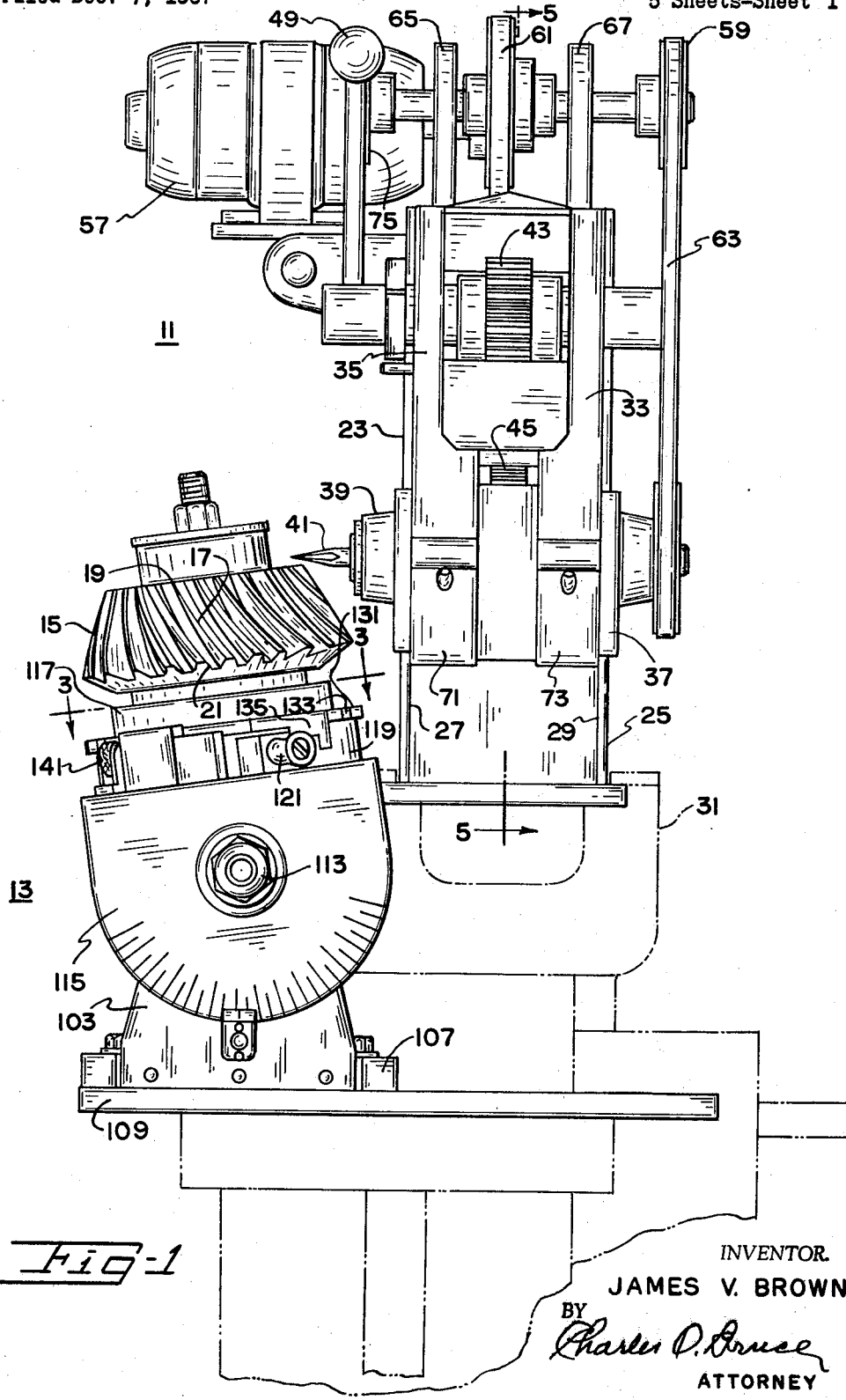
FIGURE 1 is a front elevational view of the present invention showing the deburring machine and the indexing table, with a rough cut gear mounted thereon.
Figure 2:
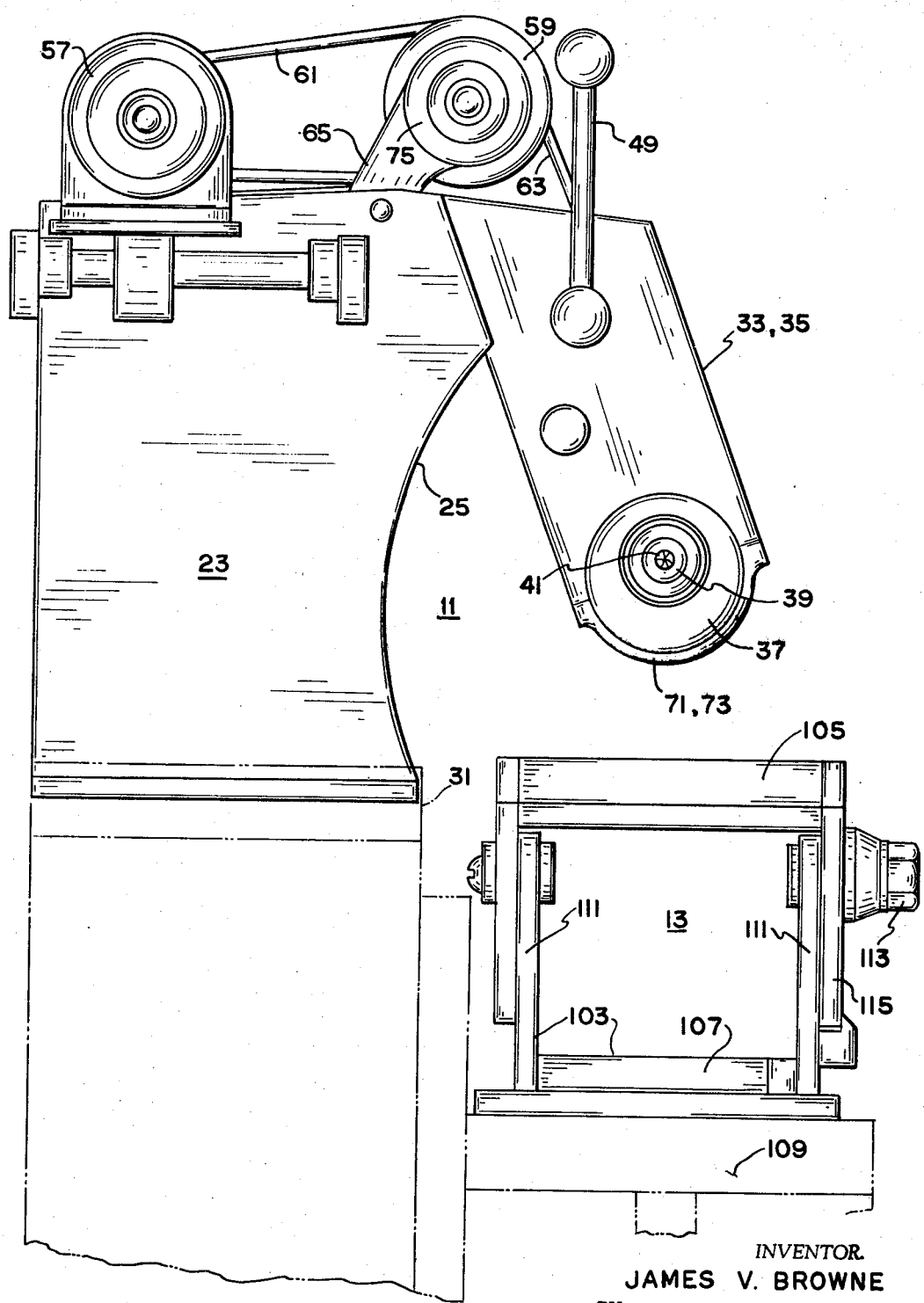
FIGURE 2 is a side elevational view of the present invention showing the deburring machine and the indexing table with the upper portion thereof deleted.

Reference is made to the drawings for a description of the preferred embodiments of the invention. There shown is a deburring machine 11 for removing the sharp edges of spiral gear teeth and an indexing table 13 for supporting a rough cut gear proximate the deburring machine. FIGURE 1 shows a spiral bevel gear 15 mounted on the indexing table. The gear tooth 17 which appears in substantially plan view in that drawing shows the two sharp edges 19, 21 of the gear tooth which are known as the heel and toe of the gear tooth and which it is necessary to remove.

The deburring machine includes a frame 23 having a base structure 25 comprised basically of two parallel plates 27, 29 secured to a work table 31. The frame includes a pair of parallel journal members 33, 35 depending downwardly from the base structure.

A bearing block 37 is secured in rotatable relation to the lower ends of the parallel journal members. The bearing block has a first axis of rotation which is concentric to the cylindrical axis of the bearing block.

A chuck 39 is journalled in the bearing block and has a second axis of rotation. The chuck is offset in the bearing block so that the axis of rotation of the chuck is displaced from the axis of rotation of the bearing block but parallel thereto. In other words, the second axis of rotation is displaced from and parallel the first axis of rotation.

A shaped cutter 41 is supported for rotation in the chuck. If the bearing block is rotated while the chuck turns the cutter, the cutter will trace a circular arc which will neatly remove the sharp edge on a gear tooth of a spiral gear.

The bearing block 37 is reversibly secured to the lower ends of the parallel journal members whereby the bearing block can be reversed so that the chuck 39 and cutter 41 project from the opposite side of the machine frame.

A drive gear 43 is journalled between the parallel journal members and meshes with an idler gear 45 which is also journalled between the same members. The idler gear also meshes with a gear section 47 formed on the external surface of the bearing block and disposed between the parallel journal members. The drive gear is actuated by a lever 49 and, in effect, interconnected with the gear section of the bearing block by the idler gear whereby as the drive gear is rotated, the bearing block is also rotated.

A counterweight 51 is connected to the drive gear whereby as the drive gear is rotated from a rest position through its operable cycle, the counterweight is lifted. When the machine operator is not actuating or releases the drive gear by means of the lever, the gear is automatically returned to the rest position by the counterweight. In the present embodiment, the counterweight is connected by a flexible line 53, such as a chain, or cord, or wire rope, to a point 55 adjacent the periphery of the drive gear to provide a moment arm on the gear for the counterweight to act on.

A drive means is provided which includes an electric motor 57 driving a pivotable idler pulley 59 through a first V belt drive 61 which in turn drives the chuck through a second V belt drive 63. The idler pulley is pivotable in a manner to compensate for the change in distance between the motor and the chuck as the chuck moves about the first axis of rotation when the bearing block is rotated. In the structural arrangement which effects this automatic compensation for the change in distance between the motor and the chuck, the idler pulley is journalled at one end of a pair of bellcranks 65, 67 or arms which are pivotally supported between the parallel plate members 27, 29 forming a portion of the base structure.

The flexible line between the counterweight and the drive gear is guided over a pulley 69 disposed at the opposite end of the bellcranks from the idler pulley. This arrangement provides tension to the V belt drive between the idler pulley and the chuck. The counterweight system thereby does double duty by providing an automatic return to the drive gear and by keeping tension on the second belt drive between the chuck and the idler pulley.

To reverse the chuck, the lower bearing caps 71, 73 are loosened and the bearing block slipped out, reversed, and secured under the bearing caps. The V belt drive between the idler and chuck is then switched to the other pulley 75 at the opposite end of the idler shaft and threaded around the same pulley on the chuck which is then disposed at the opposite side of the machine frame.

During operation, the motor drives the chuck and the shaped cutter through the idler pulley. As the handle is pulled toward the operator, the drive gear rotates the idler gear which, in turn, rotates the bearing block. The bearing block turns in a manner to rotate the chuck portion in an arc toward the operator. When this occurs, the shaped cutter which is rotated by the chuck machines off the generally horizontally disposed sharp edges of the spiral gear.

The gear is supported for machining by an indexing table 101. This table comprises a base portion 103 having an upper journal plate 105 which is pivotally supported for angular rotation with respect to the base portion 103. The base portion includes a flat lower plate 107 for securement to a work table 109 and a pair of side supporting plates 111. The pivoted mounting of the upper journal plate is maintained in a set position by a locking nut 113 which projects through both the indicator dial plate 115, which is secured to the journal plate, and one of the side plates 111 of the base portion.

A gear mounting platform 117 is rotatably supported in the upper journal plate of the base portion whereby a gear can be secured to the platform and rotated with respect to the base portion. A gear 15 secured to the mounting platform can be positioned in almost any attitude by manipulating the base portion on the work table, pivoting the journal plate with respect to the base portion, and rotating the gear mounting platform on the upper journal plate.

A ring member 119 is disposed in surrounding relation around the gear mounting platform and has a handle 121 extending radially outward therefrom. By moving the handle, the ring member can be rotated around the gear mounting platform.

A cam means 123 is secured to the ring member with an adjustable securement. The outer periphery 125 of the ring member is uniformly corrugated and the engagement side of the cam means is correspondingly corrugated so the two will not slide with respect to each other when the cam means is secured to the ring member by a bolt 127. This permits the cam means to be moved around the circumference of the ring member and secured at any position thereon. The cam means is provided with a roller 129 which absorbs the wear occurring on the cam member.

A generally circular indexing plate 131 is adjustably secured to the gear mounting platform. The indexing plate has a number of equally spaced notches 133 disposed around the periphery thereof. The number of notches is equal to the number of teeth on the gear which is being deburred. The indexing plates are removable and interchangeable to permit different indexing plates to be used for different gears having different numbers of teeth.

A notch lock 135 is adjustably secured to the upper surface of the base portion and is arranged to engage the notches of the indexing plate. The notch lock includes a guide portion 137 for the spring loaded notch latch 139 and a captured knurled nut 141 which engages the guide portion by means of a threaded shaft 143. When the set screw 145 holding the guide against the journal plate is loosened, the captured nut can be rotated to adjust the positioning of the guide and latch.

A notch drive 147 is secured to the ring member and is arranged to override the notches of the indexing plate when the ring member is rotated in one direction of rotation and positively engage the notches when the ring member is rotated in the opposite direction. The notch drive is a pivoted bellcrank 149 which has a spring 151 countersunk into the ring member and engaging one end of the bellcrank. The other end of the bellcrank has a projection 153 that has a tapered side 155 for overriding the notches and a straight side 157 for engaging the notches.

Figure 3:
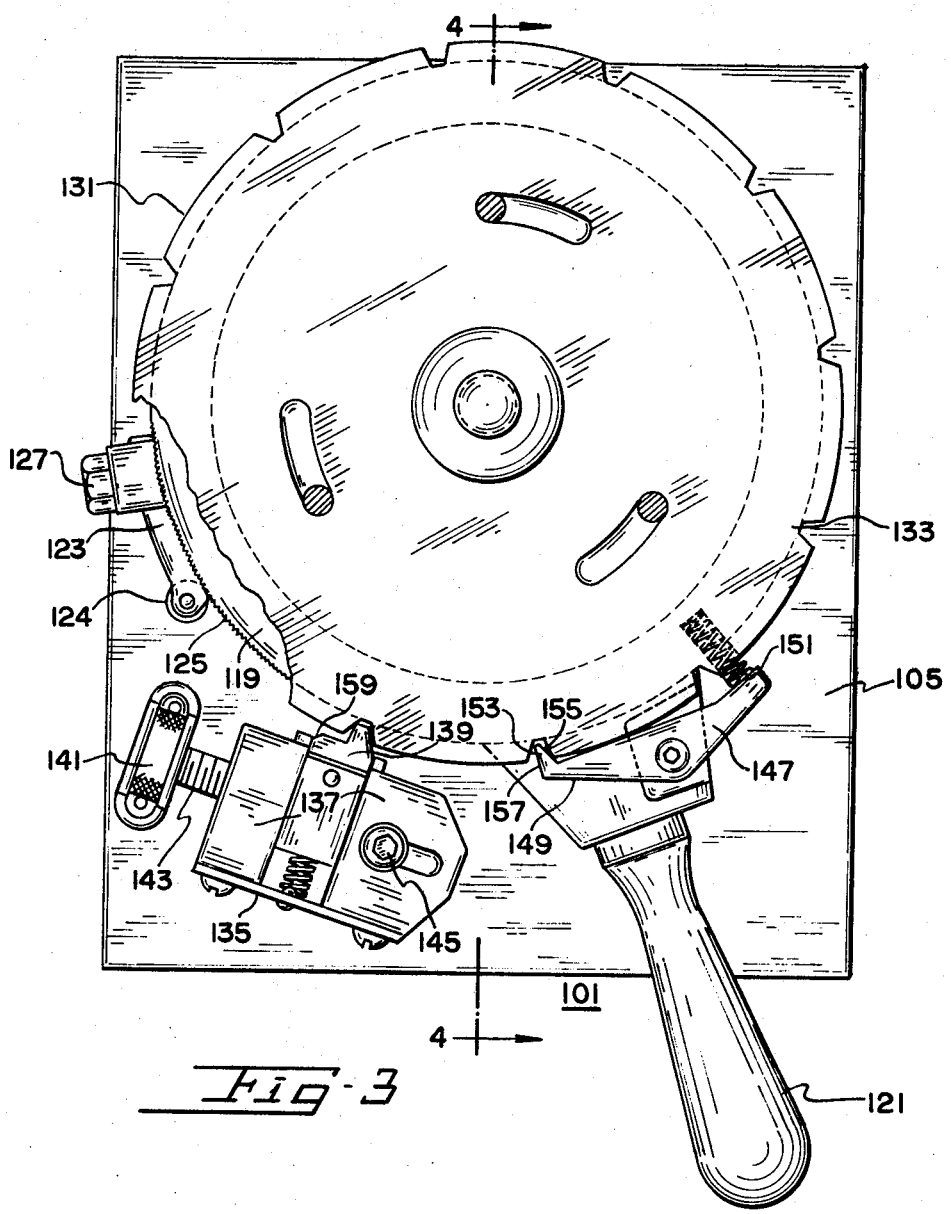
FIGURE 3 is a plan view of the indexing table of the present invention without a gear mounted thereon.
Figure 4:
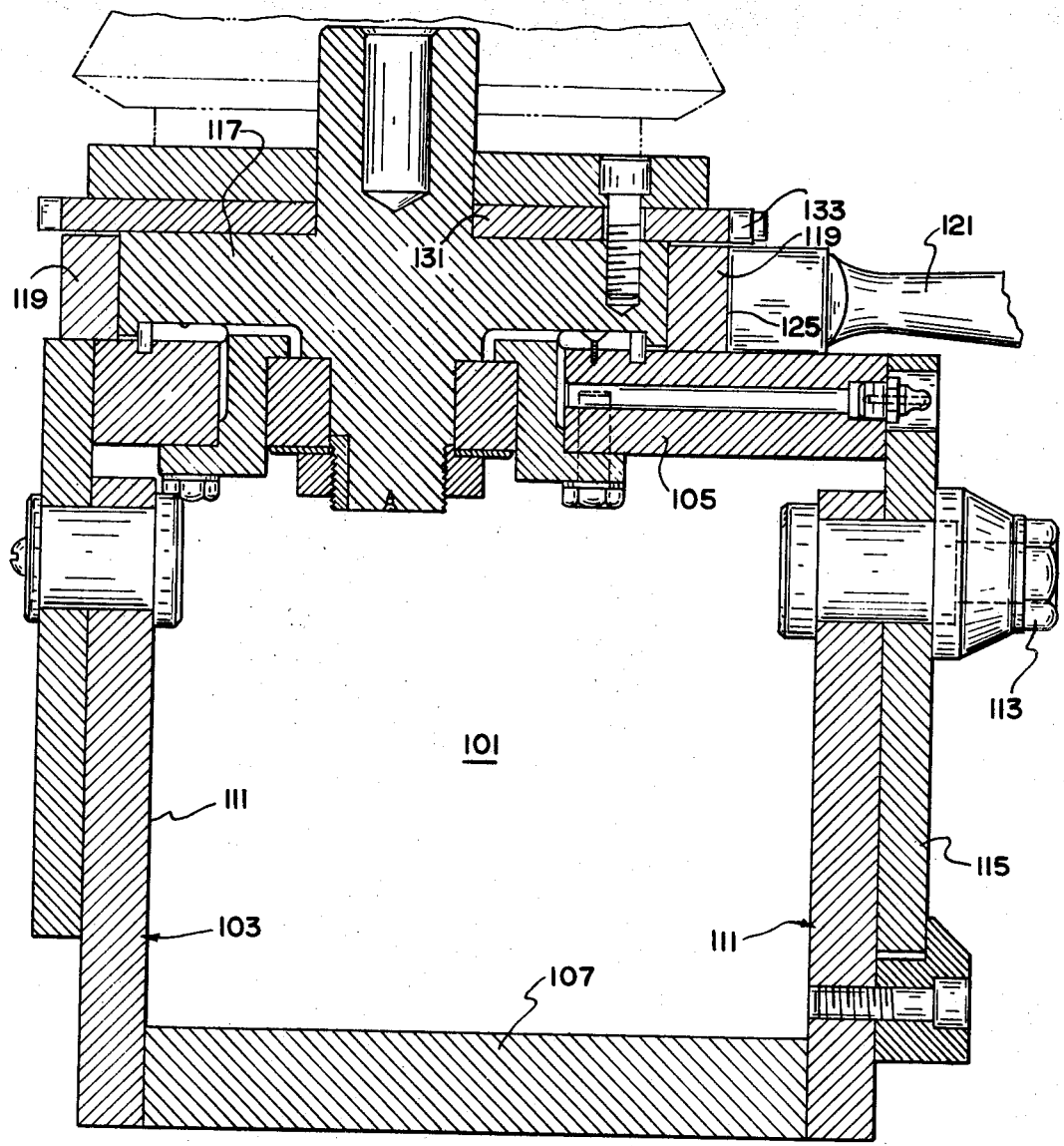
FIGURE 4 is a cross section in side elevation taken along lines 4—4 of FIGURE 3.

To operate the indexing table of the illustrated preferred embodiment, the handle 121 is moved counterclockwise as viewed in FIGURE 3. The projecting end 153 of the spring loaded latch of the notch drive moves up and out of the notch and rides the periphery of the indexing plate to the next notch. The cam means 123 moves counterclockwise with the ring member until it strikes the inclined ramp portion 159 of the latch 139 of the notch lock and moves the latch out of the notch and rearward in the guide 137. The spacing of the cam means on the ring member is arranged so that as the roller of the cam strikes the projecting portion of the latch, the counterclockwise rotation of the ring member is stopped, and the projecting portion 153 of the notch drive engages the next notch in the indexing plate. Then the handle motion is reversed and moved clockwise, and the indexing plate moves clockwise as a result of the notch drive forcing the plate to turn. The latch of the notch lock is held clear of the notch momentarily until the roller 129 of the cam means rolls off the ramp portion 159 of the latch. The notch latch then drops onto the periphery of the indexing plate as the notch it was previously engaged in has moved clockwise out from under it. The notch latch then drops into the next advancing notch to stop the rotation of the indexing plate with a new gear tooth in position for machining.

The present invention provides a new and useful device for deburring spiral gear teeth. The deburring machine does a job which had to be performed by hand previously, and the indexing table provides semi-automatic positioning of the gear teeth in position for machining which has not previously been done.

It will be apparent from the foregoing description of the invention, in its preferred form, that it will fulfill all of the objects attributable thereto. While it has been illustrated and described in considerable detail, the invention is not to be limited to such details as have been set forth except as may be necessitated by the appended claims.

I claim:

1. A deburring machine for removing the sharp edges of spiral gear teeth comprising
   a shaped cutter
   a chuck for holding and rotating said cutter, said chuck being mounted for rotation in a rotatable bearing block having an axis of rotation offset from and parallel the rotational axis of said cutter, means for manually moving said chuck about said offset axis when said chuck is rotating said cutter, drive means for rotating said chuck while said chuck moves around said offset axis, and means for automatically returning said chuck to the rest or starting position when said means for manually moving said chuck is released.

2. The deburring machine of claim 1 wherein said drive means includes a motor which drives an idler pulley which in turn drives said chuck, said idler pulley being mounted on a pivotable support to compensate for the change in distance between said pulley and said chuck as said chuck moves about said offset axis of rotation.

3. A deburring machine for removing the sharp edges of spiral gear teeth comprising a frame supporting a rotatable bearing block having a first axis of rotation, a chuck journalled in said bearing block and formed to rotate a shaped cutter about said cutter's axis of rotation at a position displaced from said first axis of rotation but parallel thereto, a gear section on said bearing and a handle actuated gear interconnected with said gear section for turning said bearing when said handle is operated, means for automatically returning said bearing to a rest or starting position when said handle is released, and drive means for rotating said chuck at least when said chuck is moving in an arc about said first axis of rotation.

4. The deburring machine of claim 3 wherein said automatic return means includes a counterweight which is lifted by the rotation of said handle actuated gear as said handle is operated.

5. The deburring machine of claim 3 wherein said drive means includes a motor which operates an idler pulley through a first belt drive which in turn drives said chuck through a second belt drive, said idler pulley being mounted on a pivotable support to compensate for the change in distance between said idler pulley and said chuck as said chuck moves about said second axis of rotation.

6. The deburring machine of claim 5, wherein said idler pulley is journalled at one end of at least one pivoted arm and the other end of said arm is counterweighted to maintain tension on said second belt drive.

7. A deburring machine for removing the sharp edges of spiral gear teeth comprising a frame having a pair of parallel journal members depending downwardly from a base structure, a bearing block secured in rotatable relation to the lower ends of said parallel journal members and having a first axis of rotation, said bearing block having a gear section formed on the external surface thereof disposed between said parallel journal members, a chuck reversibly journalled in said bearing block at a second axis parallel to but displaced from said first axis of rotation, said chuck formed to rotate a shaped cutter about said second axis of rotation, a handle actuated drive gear journalled between said parallel frame members and interconnected with said gear section of said bearing block through an idler gear whereby as said drive gear is rotated said bearing block is rotated, said drive gear being connected to a counterweight whereby as said drive gear is rotated from its rest or starting position through its operable cycle, said counterweight is lifted, and when said handle is released, said drive gear, said idler gear, and said bearing block are automatically returned to their rest or starting position, and drive means including a motor driving an idler pulley through a first belt drive which in turn drives said chuck through a second belt drive, said idler pulley being journalled at one end of at least one pivoted bellcrank whereby said idler pulley is pivotable to compensate for the change in distance between said idler pulley and said chuck as said chuck moves about said first axis of rotation.

References Cited

UNITED STATES PATENTS

| | | | |
|---|---|---|---|
| 1,279,278 | 9/1918 | Cross | 90—1.4 |
| 1,410,657 | 3/1922 | Colliau | 90—1.4 |
| 3,286,593 | 11/1966 | Bibbens | 90—1.4 |

GIL WEIDENFELD, Primary Examiner